(12) United States Patent
Weber et al.

(10) Patent No.: US 8,211,198 B2
(45) Date of Patent: Jul. 3, 2012

(54) ADJUSTABLE FILTER RACKS

(75) Inventors: Nathan A. Weber, Edmond, OK (US); Curtis A. Trammell, New Castle, OK (US)

(73) Assignee: Johnson Controls Technology Company, Holland, MI (US)

( * ) Notice: Subject to any disclaimer, the term of this patent is extended or adjusted under 35 U.S.C. 154(b) by 397 days.

(21) Appl. No.: 12/542,363

(22) Filed: Aug. 17, 2009

(65) Prior Publication Data

US 2010/0037574 A1   Feb. 18, 2010

Related U.S. Application Data

(60) Provisional application No. 61/089,792, filed on Aug. 18, 2008.

(51) Int. Cl.
*B01D 46/00* (2006.01)

(52) U.S. Cl. ............... 55/496; 55/481; 55/484; 55/506; 55/DIG. 31

(58) Field of Classification Search ............ 55/480, 55/481, 484, 496, 506, 478, DIG. 31
See application file for complete search history.

(56) References Cited

U.S. PATENT DOCUMENTS

| | | | | |
|---|---|---|---|---|
| 3,494,113 | A * | 2/1970 | Kinney | .................. 55/481 |
| 4,047,776 | A | 9/1977 | Krick et al. | |
| 4,465,499 | A | 8/1984 | Wawro et al. | |
| 4,584,751 | A | 4/1986 | Gray et al. | |
| 5,313,930 | A | 5/1994 | Kujawa et al. | |
| 5,461,880 | A | 10/1995 | Bolton et al. | |
| 5,788,729 | A | 8/1998 | Jurgensmeyer | |
| 5,944,860 | A * | 8/1999 | Mack et al. | ............... 55/492 |
| 6,076,370 | A | 6/2000 | Da Silva | |
| 6,099,612 | A | 8/2000 | Bartos | |
| 6,126,708 | A * | 10/2000 | Mack et al. | ............... 55/502 |
| 6,264,713 | B1 * | 7/2001 | Lewis, II | .................. 55/481 |
| 6,502,909 | B1 | 1/2003 | Swilik, Jr. et al. | |
| 6,592,643 | B2 | 7/2003 | Shah et al. | |
| 6,599,343 | B2 | 7/2003 | Fredrick et al. | |
| 6,638,333 | B2 | 10/2003 | Schuld et al. | |
| 6,652,613 | B2 | 11/2003 | Shah et al. | |
| 6,792,772 | B1 | 9/2004 | Seiss et al. | |
| 6,814,773 | B2 | 11/2004 | Shah et al. | |
| 7,252,696 | B2 | 8/2007 | Jenkins et al. | |
| 7,364,602 | B2 * | 4/2008 | Wu et al. | .................. 55/493 |
| 2005/0204922 | A1 * | 9/2005 | Wu et al. | ................... 96/66 |
| 2006/0042207 | A1 | 3/2006 | Jenkins et al. | |

(Continued)

FOREIGN PATENT DOCUMENTS

WO           9826229           6/1998

(Continued)

*Primary Examiner* — Robert Clemente
(74) *Attorney, Agent, or Firm* — Fletcher Yoder

(57) ABSTRACT

Filter racks are disclosed that are adjustable to accommodate filters of various thicknesses. The filter racks may include an insert that can be positioned within the base of the filter rack in two or more positions to adjust the receiving width of the filter rack. A perforated tab of the insert may be unbent to position the insert within the base at a smaller width, and the tab may be bent to position the insert within the base at a larger width. The insert also may include a divider that can be positioned within the base to reduce the width of the filter rack. Further, a rotating guide may be attached to detents within walls of the filter rack compartment. The guide may be biased at various angles to accommodate filters of different widths.

19 Claims, 15 Drawing Sheets

U.S. PATENT DOCUMENTS

| | | | |
|---|---|---|---|
| 2006/0260284 A1* | 11/2006 | Masciotra | 55/493 |
| 2010/0101197 A1* | 4/2010 | Livingstone et al. | 55/356 |

FOREIGN PATENT DOCUMENTS

| | | |
|---|---|---|
| WO | 9826232 | 6/1998 |
| WO | 9935421 | 7/1999 |
| WO | 9935448 | 7/1999 |
| WO | 0150068 | 7/2001 |
| WO | 0150071 | 7/2001 |
| WO | 0150072 | 7/2001 |
| WO | 2007012159 | 2/2007 |

\* cited by examiner

ADJUSTABLE FILTER RACKS

CROSS REFERENCE TO RELATED APPLICATIONS

This application claims priority from and the benefit of U.S. Provisional Application Ser. No. 61/089,792, entitled "ADJUSTABLE FILTER RACKS", filed Aug. 18, 2008, which is hereby incorporated by reference.

BACKGROUND

The invention relates generally to adjustable filter racks for heating, ventilating and air conditioning (HVAC) systems.

A wide range of applications exists for HVAC systems. For example, residential, light commercial, commercial and industrial systems are used to control temperatures and air quality in residences and buildings. HVAC units, such as air handlers, heat pumps, and air conditioning units, are used to provide heated, cooled, and/or dehumidified air to conditioned environments. Generally, air may flow through filters within the HVAC units before entering the conditioned environment to remove particulates and contaminates from the air for human and/or mechanical purposes. The thickness of the filter may affect various properties such as the quality of filtration, the length of time until filter replacement, and the energy consumption of the HVAC unit. For example, a thicker filter may be able to trap an increased number of particulates and therefore have a longer filtration life. Further, the pressure drop across a thicker filter may be less, resulting in lower energy consumption by the fan that draws air through the filter.

Due to the increased air quality and lower energy consumption that can be achieved using thicker filters, thicker filters are more frequently included within HVAC units. For example, industries may increasingly install thicker filters to comply with environmental regulations and initiatives. However, thicker filters are generally more expensive and may not be needed during certain periods, such as low heating or cooling times of the year. Therefore, consumers may want to switch between thicker and thinner filters based on the heating and cooling requirements and business needs and considerations. HVAC units, however, are generally designed to accommodate filters of only one thickness, limiting a consumer's flexibility to use different size filters.

SUMMARY

The present invention relates to HVAC units with adjustable filter racks designed to respond to such needs. The concepts described below may be employed in various HVAC units, including air conditioners, heat pumps, light commercial industrial, chiller, and other systems and system components. The configurations are particularly well suited to single package HVAC units. The embodiments may include inserts designed to rest within a base of the filter rack in various positions for accommodating filters of different thicknesses. The embodiments also may include filter racks with rotatable guides configured to bias against the sides of filters of different thicknesses.

DRAWINGS

DETAILED DESCRIPTION

Figure 1:
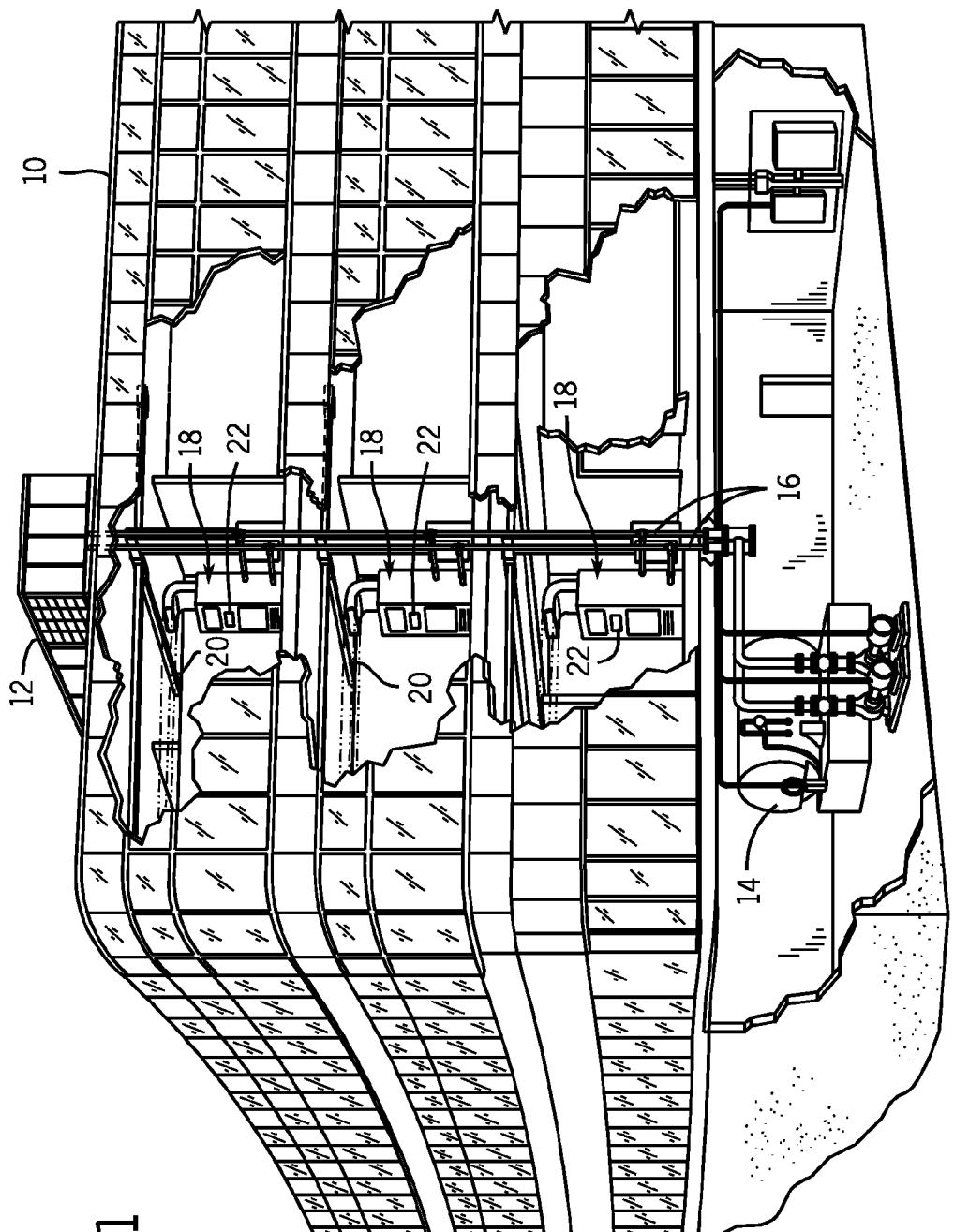
FIG. 1 is an illustration of an exemplary embodiment of a commercial or industrial heating, ventilating, air conditioning, and refrigeration system that employs HVAC units with filters.

FIG. 1 illustrates an exemplary application; in this case a heating, ventilating, air conditioning, and refrigeration (HVAC&R) system for building environmental management that may employ one or more HVAC units employing filters. A building 10 is cooled by a system that includes an HVAC unit 12 and a boiler 14. As shown, HVAC unit 12 is disposed on the roof of building 10 and boiler 14 is located in the basement; however, the HVAC unit and boiler may be located in other equipment rooms or areas next to the building.

HVAC unit 12 is an air cooled or water cooled device that implements a refrigeration cycle to provide cooled air to building 10. HVAC unit 12 may be a stand-alone unit or may be part of a single package unit containing other equipment, such as a blower, integrated air handler, and/or auxiliary heating unit. In certain embodiments, the HVAC unit may be a heat pump that provides both heating and cooling to the building. In these embodiments, the boiler may not be required. However, in other embodiments, the HVAC unit may provide cooling while the boiler provides heating.

Boiler 14 is a closed vessel that includes a furnace to heat water. The water from boiler 14 is circulated through building 10 by water conduits 16. Water conduits 16 are routed to air handlers 18, located on individual floors and within sections of building 10. Air handlers 18 include heat exchangers that circulate hot water from boiler 14 to provide heated air. Air handlers 18 also may receive the cooled air the from HVAC unit 12 to areas within building 10. Ductwork 20, coupled to air handlers 18, may receive air from an outside intake (not shown) and is adapted to distribute air between the air handlers. Fans, within air handlers 18, direct the conditioned air to environments within building 10, such as rooms, apartments or offices, to maintain the environments at a designated temperature.

A control device, shown here as including a thermostat 22, may be used to designate the temperature of the conditioned air. Control device 22 also may be used to control the flow of air through and from air handlers 18. Other devices may, of course, be included in the system, such as control valves that regulate the flow of water and pressure and/or temperature transducers or switches that sense the temperatures and pressures of the water, the air, and so forth. Moreover, control devices may include computer systems that are integrated with or separate from other building control or monitoring systems, and even systems that are remote from the building.

Figure 2:
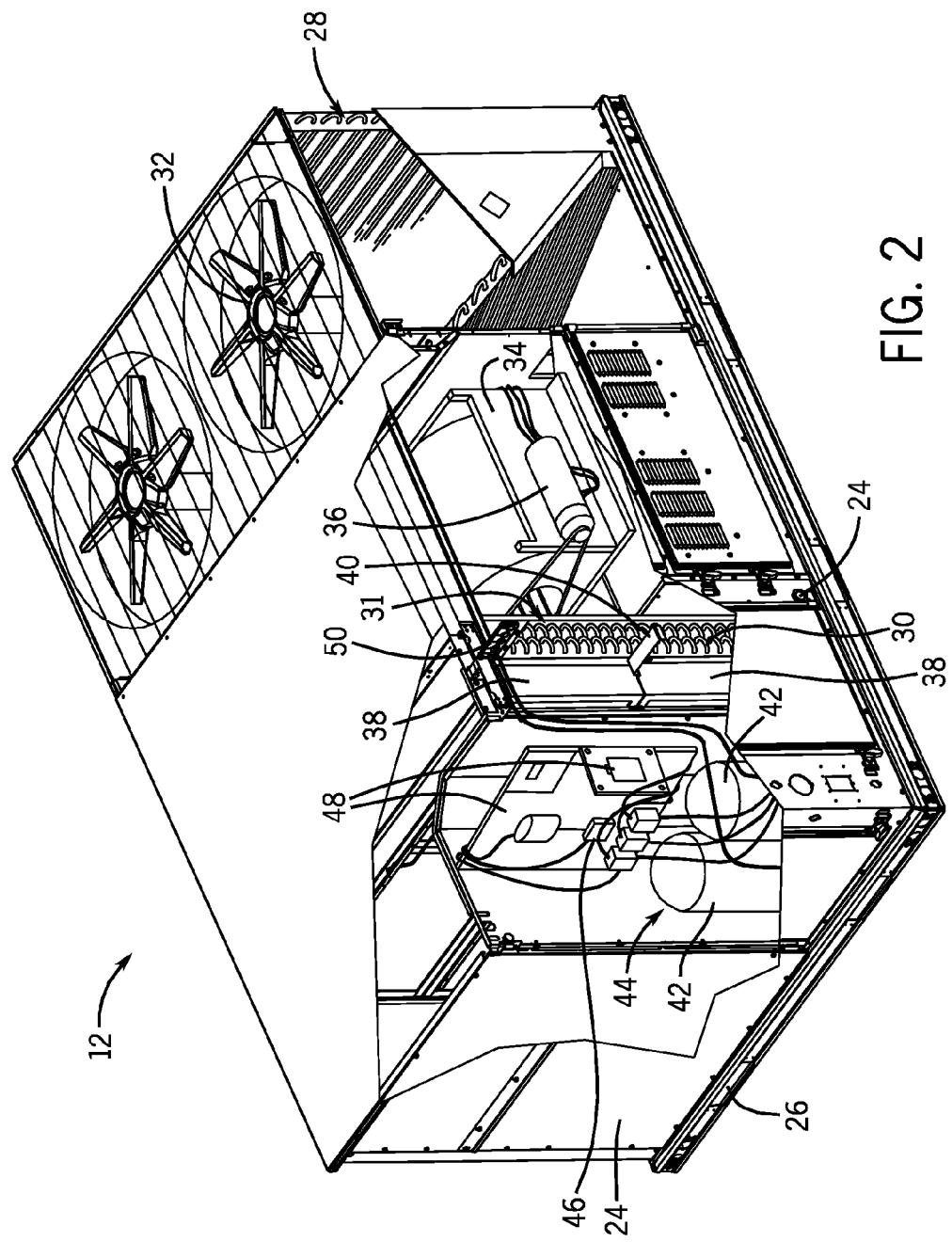
FIG. 2 is a perspective of the HVAC unit shown in FIG. 1 with a portion of the cabinet removed to reveal internal components.

FIG. 2 depicts HVAC unit 12, shown here as an air conditioning package unit, with a portion of the external covering removed to show the internal components. As a single package unit, the air handler may include one or more independent refrigeration circuits and components that are tested, charged, wired, piped, and ready for installation. Of course, in other embodiments, the air handler may be a standalone unit that may be connected to one or more external refrigeration circuits and associated equipment. The air handler may provide a variety of heating and/or cooling functions, such as cooling only, heating only, cooling with electric heat, cooling with dehumidification, cooling with gas heat, or cooling with a heat pump.

A cabinet 24 encloses unit 12 providing structural support and protecting the internal components from environmental and other contaminants. According to exemplary embodiments, the cabinet may be constructed of galvanized steel and insulated with aluminum foil faced insulation. Of course, in other embodiments, the cabinet may be constructed of any suitable material. Rails 26 are adjoined to the bottom perimeter of cabinet 24 and provide a solid foundation for unit 12. In certain embodiments, the rails may provide access for a three-way forklift and overhead rigging.

HVAC unit 12 includes two heat exchangers 28 and 30 in fluid communication with one or more refrigeration circuits. Tubes within the heat exchangers may circulate refrigerant, such as R-410A, or any other suitable heat transfer fluid, such as steam or water, through the heat exchangers. The tubes may be of various types, such as multichannel tubes, conventional copper or aluminum tubing, and so forth. Together, the heat exchangers may implement a thermal cycle in which the refrigerant undergoes phase changes and/or temperature changes as it flows through the heat exchangers to produce heated and/or cooled air. For example, heat exchanger 28 may function as a condenser where heat is released from the refrigerant to heat an air stream, and heat exchanger 30 may function as an evaporator where the refrigerant absorbs heat to cool an air stream. In another example, the air handler may operate in a heat pump mode where the roles of the heat exchangers may be reversed. That is, heat exchanger 28 may function as an evaporator and heat exchanger 30 may function as a condenser.

Heat exchanger 30 is located within a compartment 31 that separates heat exchanger 30 from heat exchanger 28. Fans 32 draw air from the environment through heat exchanger 28. As the environmental air flows through heat exchanger 28 it is heated or cooled and released back to the environment. A blower assembly 34, powered by a motor 36, draws air through heat exchanger 30 to heat or cool the air. The heated or cooled air may be directed to a building or residence by ductwork connected to unit 12. Before entering the ductwork, the conditioned air flows through one or more filters 38 that may remove particulates and contaminants from the air. In certain embodiments, the filters 38 may be disposed on the air intake side of heat exchanger 30 to prevent contaminants from contacting heat exchanger 30. The filters may be any suitable HVAC filter type, such as fiberglass filters, polyester filter media pads, or electrostatic filters, and may be of various sizes, such as one, two, three or four inches in thickness. Different filter thicknesses may be used to achieve various levels of filtration and energy consumption. For example, a thicker filter may provide a higher level of filtration with a lower pressure drop across the heat exchanger, resulting in lower energy consumption by the blower assembly.

The filters 38 may be disposed on one or more filter racks 40 located within compartment 31. The filter racks may be constructed of metal or other suitable material and may slide outward from compartment 31 to facilitate filter replacement. According to exemplary embodiments, the filter racks may hold one or more filters vertically aligned within the compartment. As described below with respect to FIGS. 3 through 12, the filter racks may be adjustable to hold filters of various thicknesses.

HVAC unit 12 also may include other equipment for implementing the thermal cycle. Compressors 42 reduce the volume available for the refrigerant, consequently, increasing the pressure and temperature of the refrigerant before the refrigerant enters a heat exchanger functioning as a condenser. The compressors may be any suitable type of compressors, such as scroll compressors or reciprocating compressors. According to exemplary embodiments, the compressors may include a pair of hermetic direct drive compressors arranged in a dual stage configuration 44. However, in other embodiments, any number of compressors may be provided to achieve various stages of heating and/or cooling. As may be appreciated, additional equipment and devices may, of course, be included in the HVAC unit. For example, the unit may include a solid-core filter drier, a drain pan, a disconnect switch, and economizer, pressure switches, phase monitors, and humidity sensors among other things.

HVAC unit 12 may receive power through a terminal block 46. For example, a high voltage power source may be connected to terminal block 46 to power the equipment. The operation of unit 12 may be governed by a control board 48. The control board may include control circuitry connected to a thermostat, sensors, and alarms. The control circuitry may be configured to control operation of the equipment, provide alarms, and monitor safety switches. Wiring 50 may connect control board 48 and terminal block 46 to the equipment of unit 12.

Figure 3:
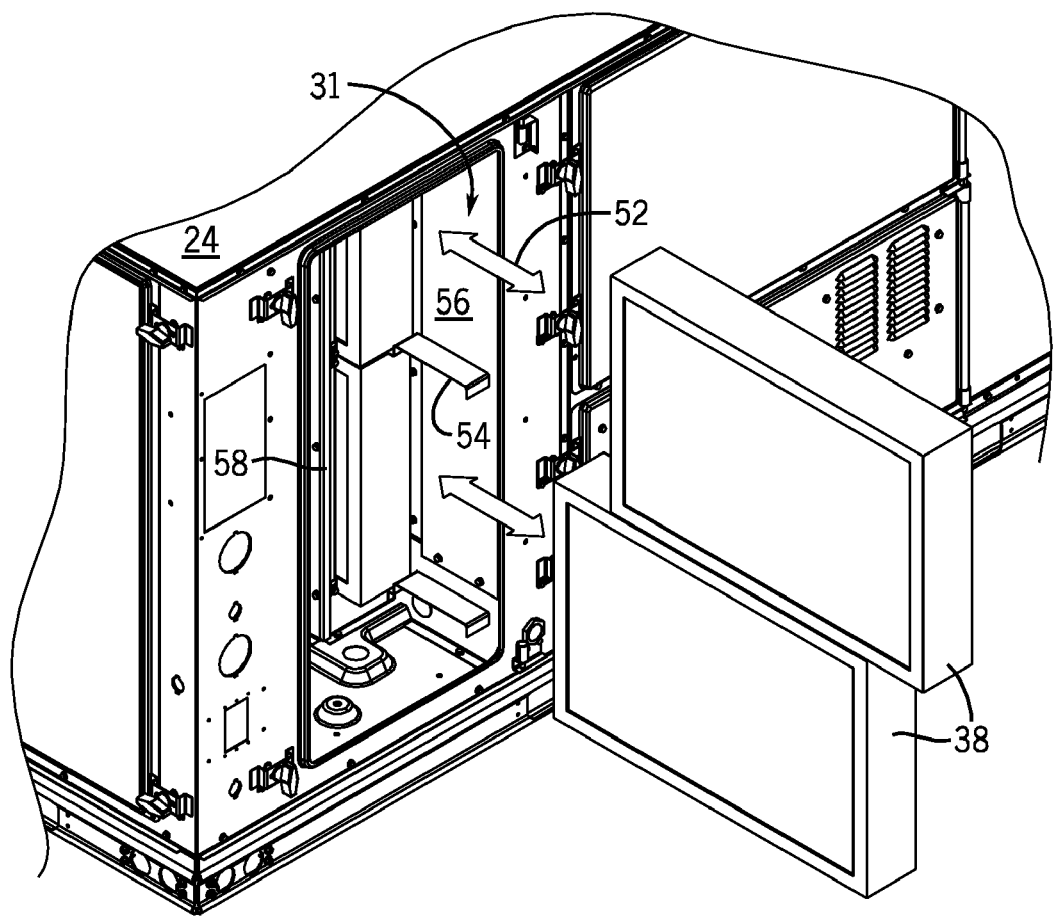
FIG. 3 is a perspective view of the HVAC unit shown in FIG. 1 illustrating the installation and removal of filters.

FIG. 3 depicts the unit with an access panel removed to access compartment 31. Filters may be removed from and installed within compartment 31 as shown generally by arrows 52. The filter racks may include an extended portion or tab 54 that may by grasped by a user to slide the filters in the direction of arrows 52. Panels or walls 56 and 58 may be located on the sides of the filter racks to form compartment 31.

Figure 4:
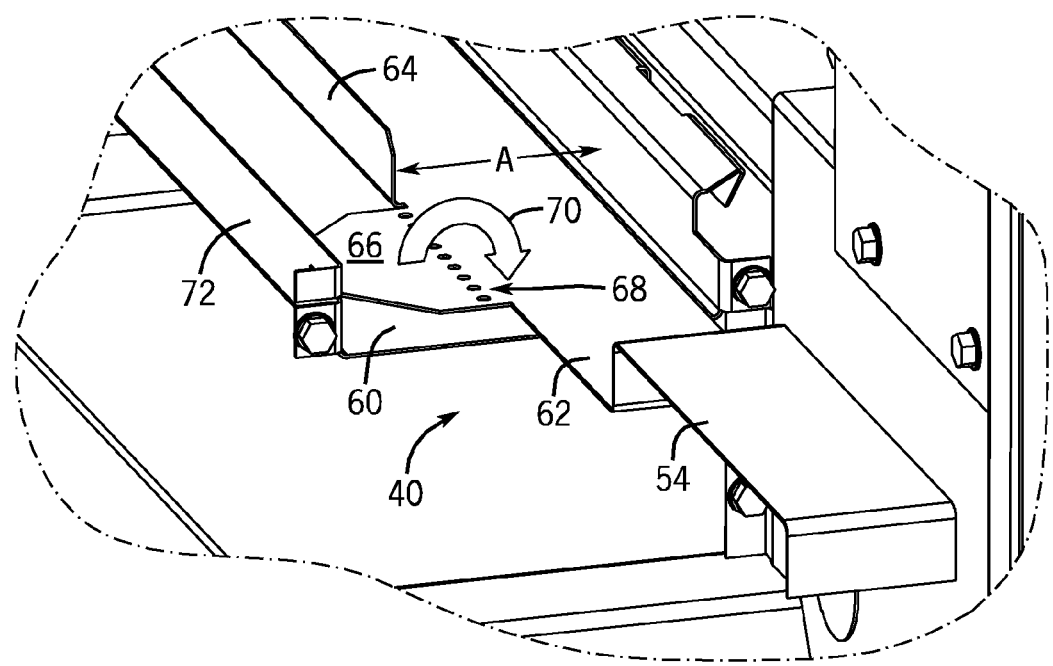
FIG. 4 is a perspective view of an exemplary embodiment of a filter rack that may be used in the HVAC unit of FIG. 1.

FIG. 4 is a detailed view of filter rack 40. Filter rack 40 includes a base or support 60 that may be mounted to the cabinet or to the walls of the compartment 31 (FIG. 3). An insert 62 may be disposed on base 60 to allow the filter rack to be adjusted to accommodate various filter sizes or thicknesses. Insert 62 includes a lip or rail 64 for supporting a filter as well as a tab 66 for positioning insert 62 within base 60. Tab 66 includes perforations 68 that allow tab 66 to be bent upward as indicated generally by an arrow 70. In certain embodiments, the perforations may be stamped or punched into the insert. Insert 62 also may include tab 54 that may be grasped by a user to slide the insert 62 and filters out from the cabinet as shown in FIG. 3.

As shown, tab 66 is unbent and lies in a generally flat manner on base 60. In the unbent position, the tab 66 is intended to rest against a lip or rail 72 of base 60 to allow insert 62 to accommodate a filter of a thickness A. According to exemplary embodiments, the base may include a pair of rails 72 forming a shallow U-shaped channel. When installed, a filter of thickness A may be disposed on insert 62 and be supported by rail 64. In certain embodiments, insert 62 may slide outward on base 60 to facilitate installation and removal of the filters. According to exemplary embodiments, the distance A may accommodate a filter that has a nominal thickness of two inches. However, the length of tab 66 may be varied to accommodate filters of different thicknesses. Base 60 and insert 62 may constructed of metal, plastic, or other suitable material. Further, the insert may include any number of tabs and perforations disposed along the length of the insert. In other embodiments, the tabs and perforations may be disposed on the other side of the insert or on both sides of the insert.

Figure 5:
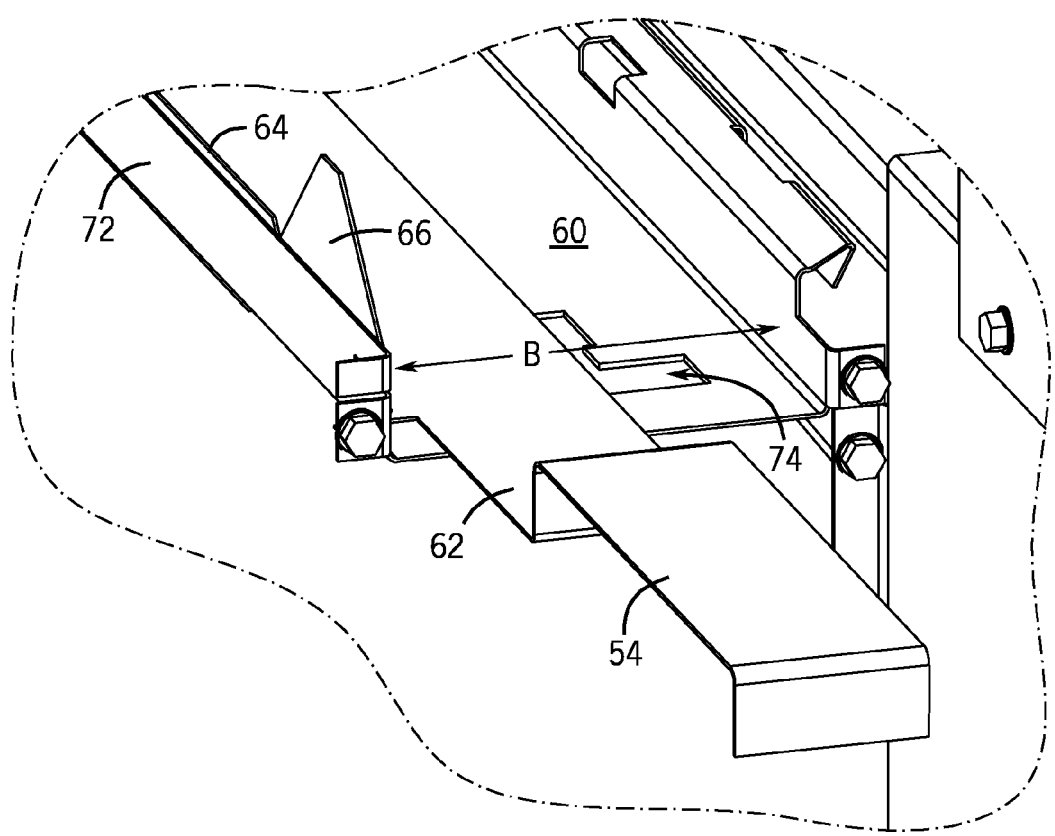
FIG. 5 is a perspective view of the filter rack of FIG. 4 illustrating the filter rack insert with a bent tab.

FIG. 5 depicts insert 62 with tab 66 in the bent position. According to exemplary embodiments, a user may bend tab 66 into the upward position by hand to accommodate a filter of a thickness B. With tab 66 in the bent position, insert 62 may move horizontally across the width of base 60 until tab 66 rests against rail 72. In this position, a filter of a larger thickness B may be disposed on insert 62 and base 60. A portion of the filter may rest on insert 62 and another portion may rest directly on base 60. According to exemplary embodiments, the distance B may accommodate a filter that has a nominal thickness of four inches.

Base 60 also may include an opening or slot 74 for receiving insert 62. For example, in certain embodiments, insert 62 may include a lower tab extending vertically downward that may be placed within slot 74 to secure insert 62 on base 60. One or more slots 74 may be disposed along the length of base 60. However, in other embodiments, the slots may be omitted and the insert may simply rest on the base. Further, in certain embodiments, tabs of multiple lengths may be included to accommodate filters of three or more thicknesses. For example, the insert may include a long tab and a short tab. When both tabs are in the unbent position, the filter rack may accommodate a filter of a narrow thickness. When the long tab is bent and the short tab remains unbent, the filter rack may accommodate a filter of a medium thickness. When both tabs are in the bent position, the filter rack may accommodate a filter of a larger thickness, which in certain embodiments may approximate the width of the base.

Figure 6:
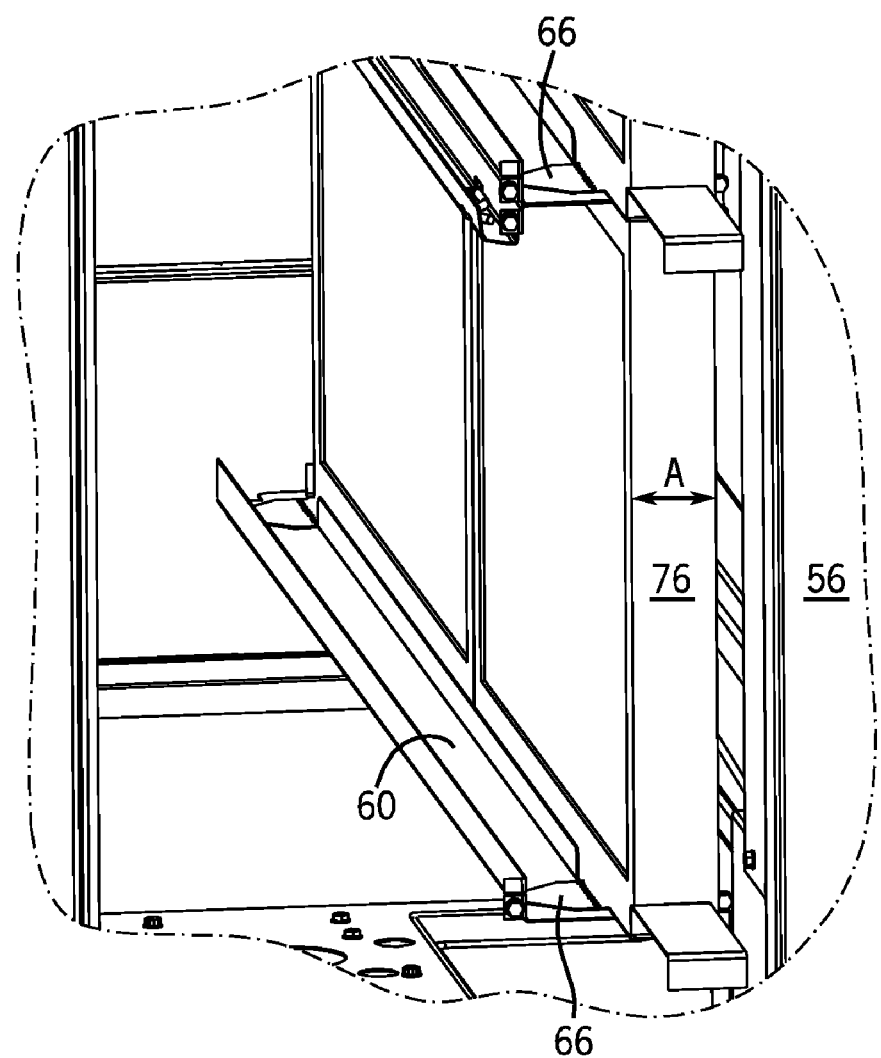
FIG. 6 is a perspective view of the filter rack of FIG. 4 with a narrow filter installed.
Figure 7:
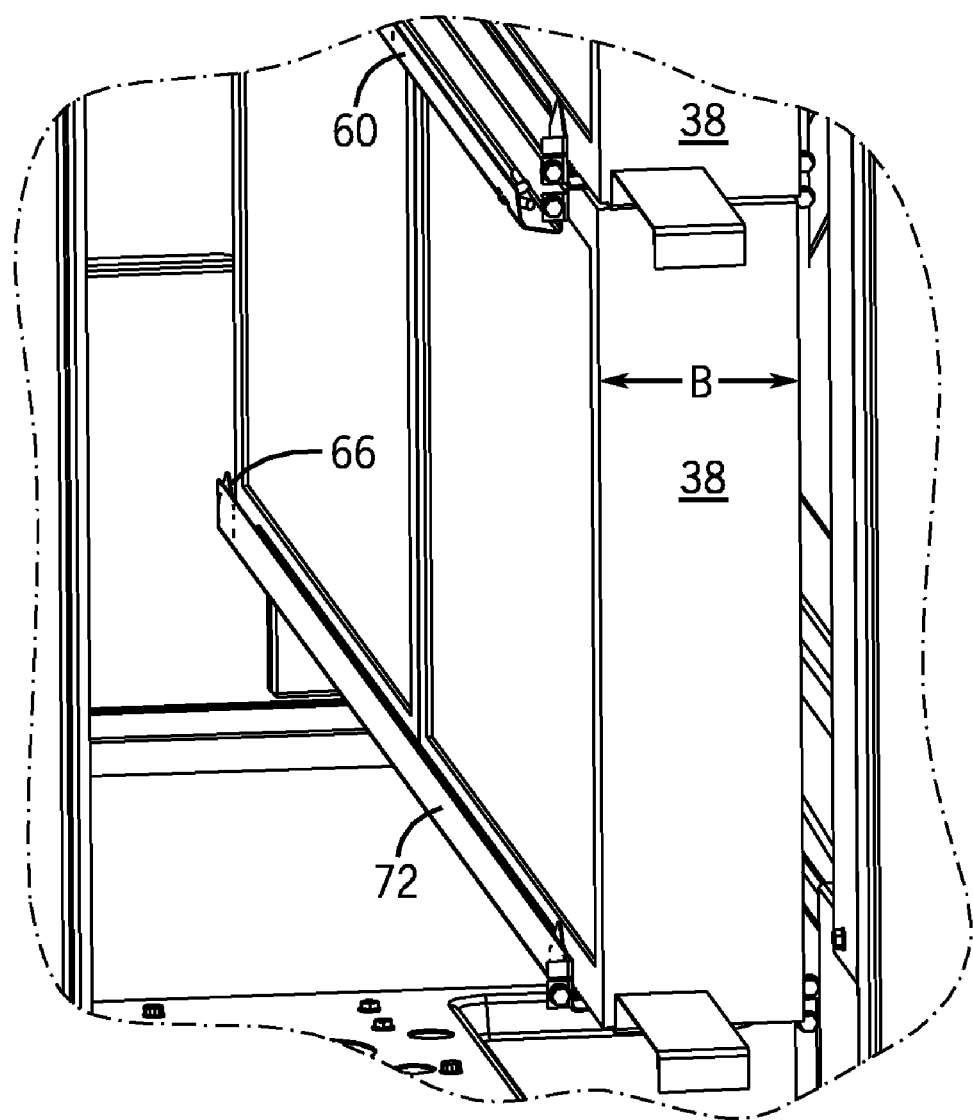
FIG. 7 is a perspective view of the filter rack of FIG. 4 with a wide filter installed.

FIGS. 6 and 7 depict filters 38 and 76 installed within the filter racks. Specifically, FIG. 6 depicts filters 76 of thickness A within the filter racks. As shown, tabs 66 are in the unbent position to accommodate the narrower filters. FIG. 7 depicts wider filters 38 of thickness B within the filter racks. To accommodate the thicker filters, tabs 66 are in the bent position and disposed adjacent to rail 72 of base 60.

Figure 8:
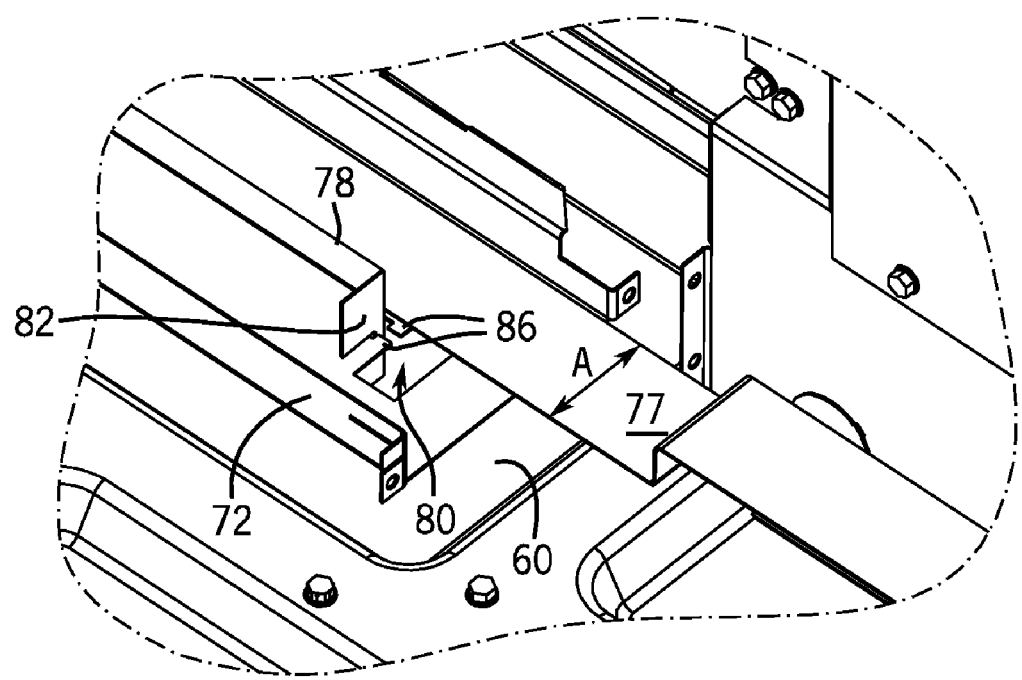
FIG. 8 is a perspective view of another exemplary embodiment of a filter rack that may be used in the HVAC unit of FIG. 1.

FIG. 8 illustrates an alternate insert 77 that may be used in conjunction with a divider 78 to accommodate different filter sizes. The insert and divider may be constructed of metal, plastic, or other suitable material. Divider 78 may be installed through a slot 80 of base 60. A bent portion 82 of divider 78 may be placed through a larger opening of slot 80. Divider 78 may then be positioned within slot 80 so that a portion of divider 78 is located above base 60 and another portion of divider 78 is located below base 60. Divider 78 may further be positioned within a smaller opening of slot 80 and may rest against extensions or stops 86. When inserted, divider 78 functions to reduce the width of the filter rack to allow the filter rack to receive a filter of a smaller thickness A. When divider 78 is installed, a filter of thickness A may be disposed on insert 77. In other embodiments, the location of slot 80 may be adjusted to accommodate filters of different thicknesses. Further, in certain embodiments, multiple slots may be included and disposed in various positions across the width of base 60 to allow the divider to be inserted in different slots to accommodate filters of various thicknesses.

Figure 9:
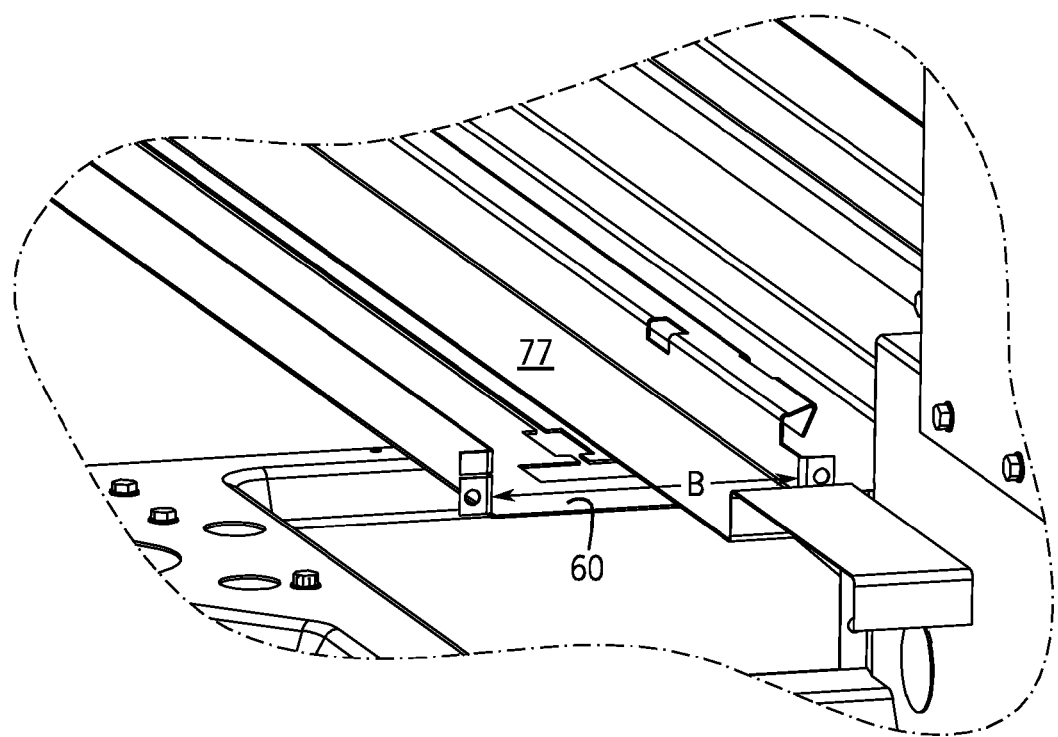
FIG. 9 is a perspective view of the filter rack of FIG. 8 with the divider removed to accommodate a wide filter.

FIG. 9 depicts insert 77 installed on base 60 without the divider inserted. When the divider is not inserted, the filter rack may receive a larger filter of thickness B. A filter of thickness B may be disposed partially on insert 77 and partially on base 60. When the divider is not installed, the entire width of base 60 may be used to support the filter.

Figure 10:
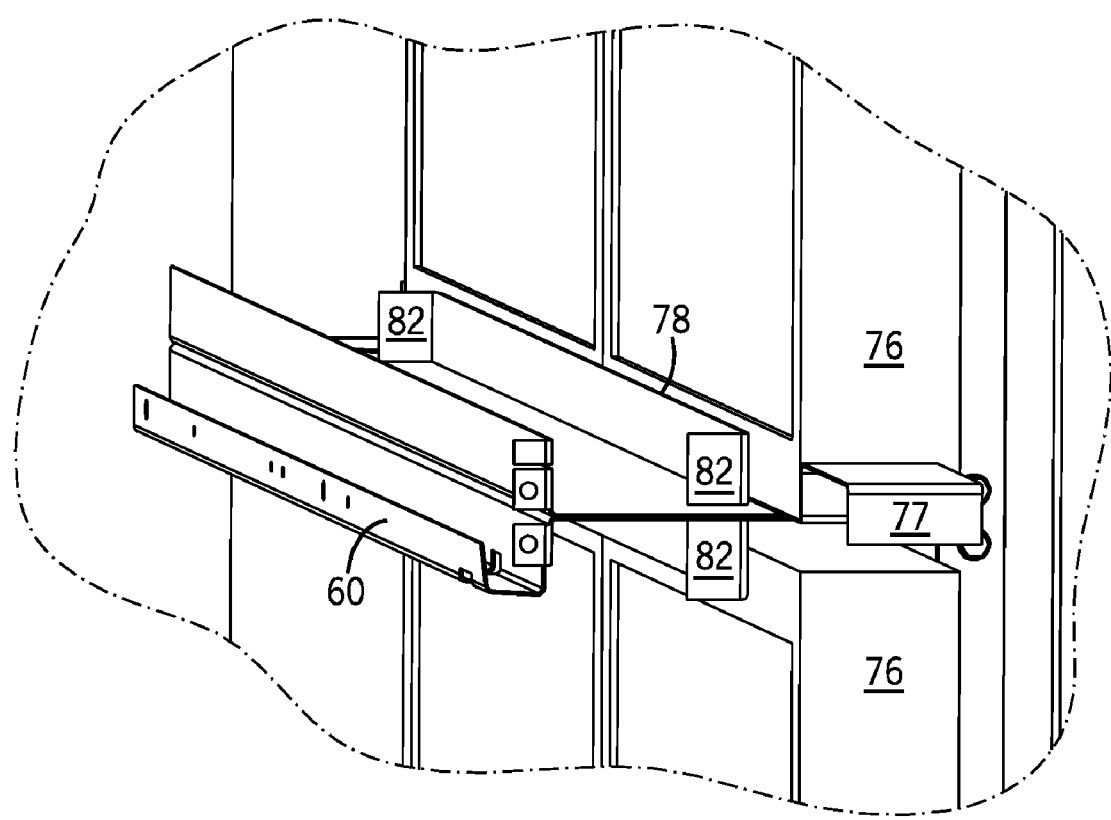
FIG. 10 is a perspective view of the filter rack of FIG. 8 with a narrow filter installed.

FIG. 10 depicts narrow filters 76 installed within base 60 when divider 78 has been installed within slots of base 60. As shown, divider 78 includes two bent portions 82 that may be inserted within aligned slots within base 60. As noted above with respect to FIG. 8, divider 78 reduces the width of the filter rack to accommodate the narrower filters 76. Filters 76 may be supported on one side by divider 78 and on the other side by a rail of base 60. It should be noted that the rails of base 60 may extend both above and below base 60 to support upper and lower filters 76.

Figure 11:
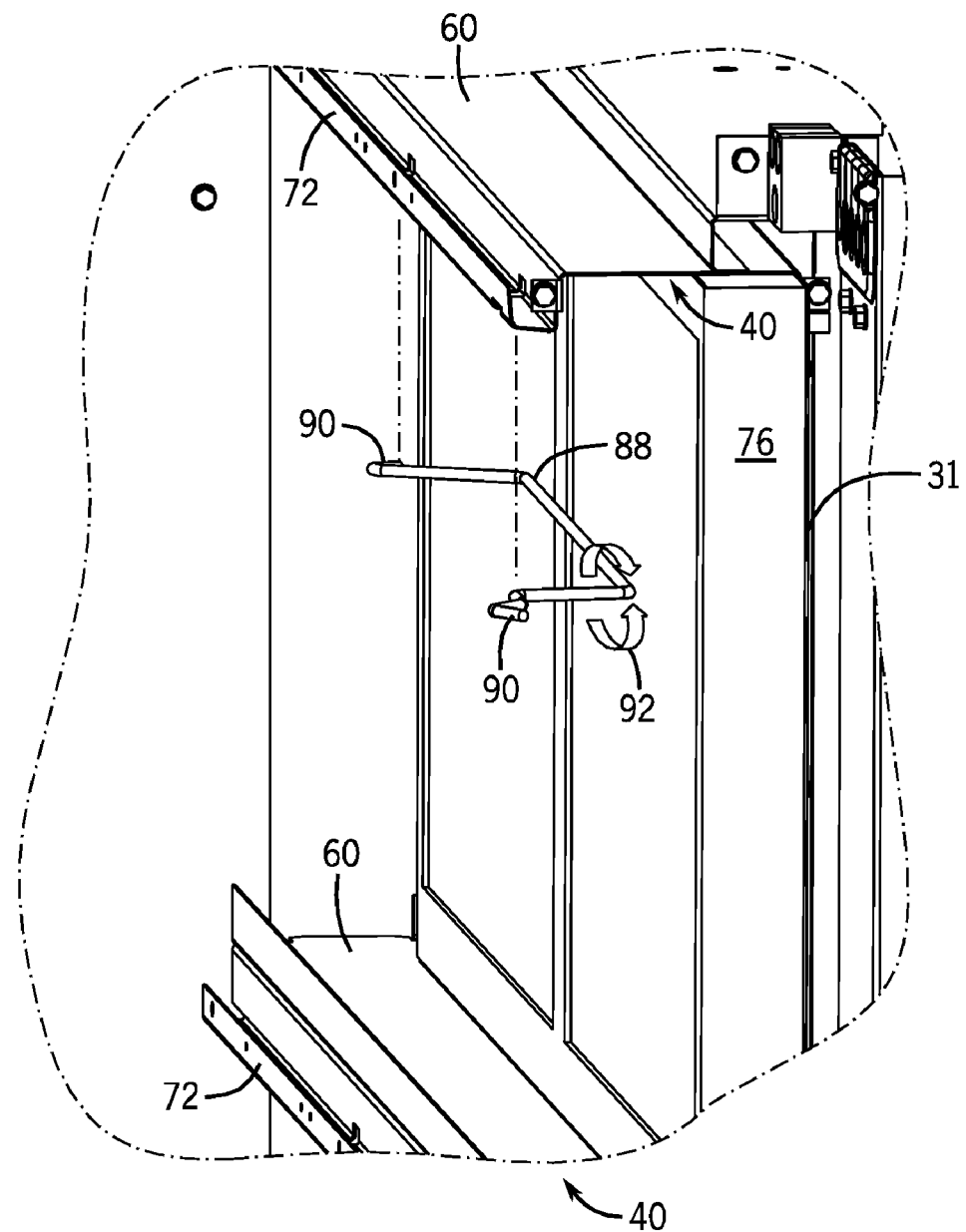
FIG. 11 is a perspective view of another exemplary embodiment of a filter rack that may be used with a rotatable guide in the HVAC unit of FIG. 1.

FIG. 11 depicts an alternate adjustable filter rack that employs an adjustable guide 88 to accommodate different filter sizes. Guide 88 may be constructed of metal, plastic, tubing, or other suitable material. Ends 90 of guide 88 may be affixed or inserted into detents or other suitable mechanical stops that form a locking system. For example, as shown, the detents may be included in one or more of the filter racks 40 mounted within compartment 31. In another example, the detents may be disposed within walls 56 or 58 (FIG. 3) of compartment 31. In certain embodiments, a pair of detents may be stamped within a wall of the compartment and/or within a rail of the filter rack.

Regardless of the detent location, the detents may include stops positioned at various intervals. Guide 88 may be rotated in the upward or downward direction as indicated generally by arrows 92 to accommodate various filter sizes. The stops within the detents may be used to position the guide at various angles corresponding to different filter sizes. As shown, guide 88 is disposed in a generally horizontal position to accommodate a narrow filter 76. Guide 88 may abut filter 76 to support the filter. According to exemplary embodiments, the guide may be biased against the outlet side of the filter. However, in other embodiments, the guide may be biased against the inlet side of the filter. Further, a pair of guides may be provided, one for each side of the filter. When installed, filter 76 may be supported vertically by base 60 of the lower filter rack 40 and may be supported horizontally by guide 88. As may be appreciated, detents may be configured to include stops at a variety of positions. For example, guide 88 may be positioned at approximately a forty-five degree angle to accommodate a filter of a medium thickness. Any number of stop positions may be provided for filter guide 88 to accommodate a variety of different filter thicknesses.

Figure 12:
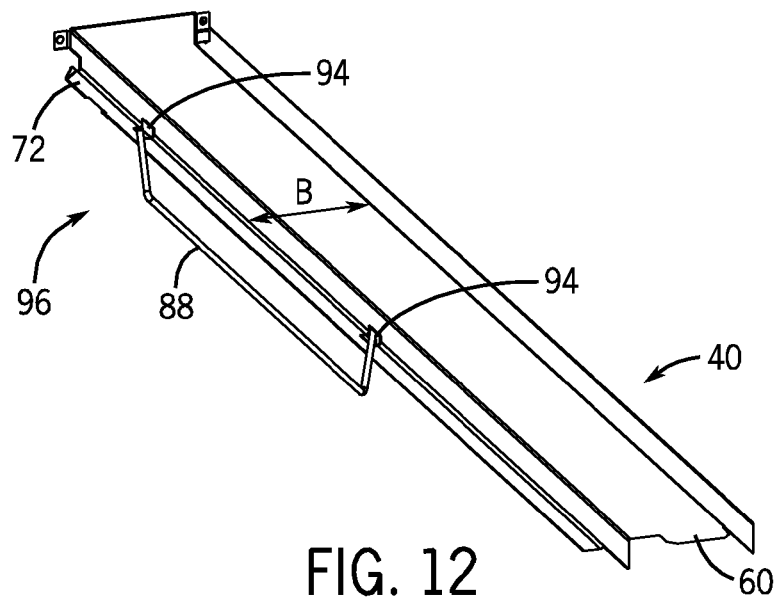
FIG. 12 is a perspective view of the filter rack of FIG. 11 with the rotatable guide in a vertical position to accommodate a wide filter.
Figure 13:
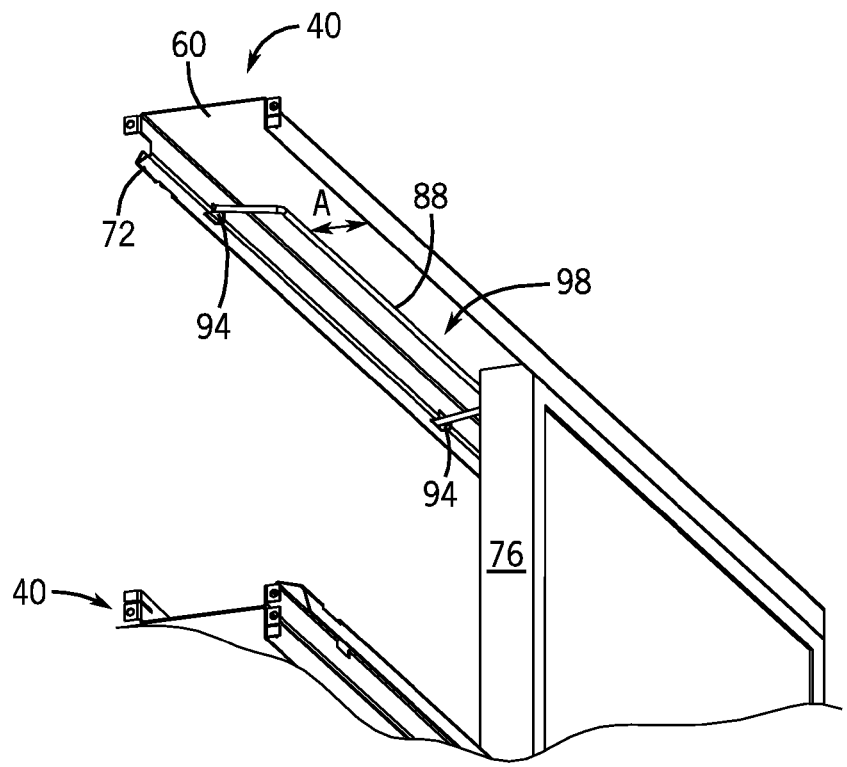
FIG. 13 is a perspective view of the filter rack of FIG. 11 with the rotatable guide in a horizontal position to accommodate a narrow filter.

FIG. 12 depicts an embodiment of detents that may be employed to control rotation of guide 88. The detents may include openings 94 located in rail 72 of filter rack 40. Ends 90 (FIG. 11) of guide 88 may be inserted through openings 94 to affix guide 88 to filter rack 40. Openings 94 may allow guide 88 to rotate between a vertical position 96 shown in FIG. 12 to a horizontal position 98 shown in FIG. 13. When guide 88 is located in vertical position 96, guide 88 may support a wide filter 38 (FIG. 3) of a width B. When guide 88 is located in horizontal position 98, guide 88 may support a narrow filter 76 of a smaller width A.

Figure 14:
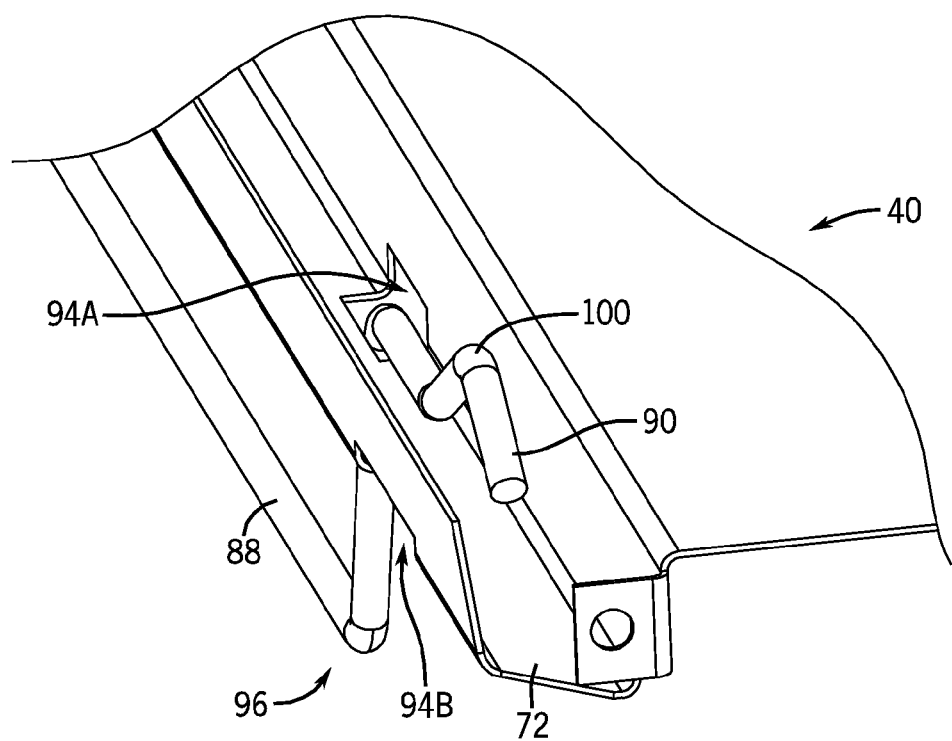
FIG. 14 is a detail view of an embodiment of the rotatable guide in the vertical position.
Figure 15:
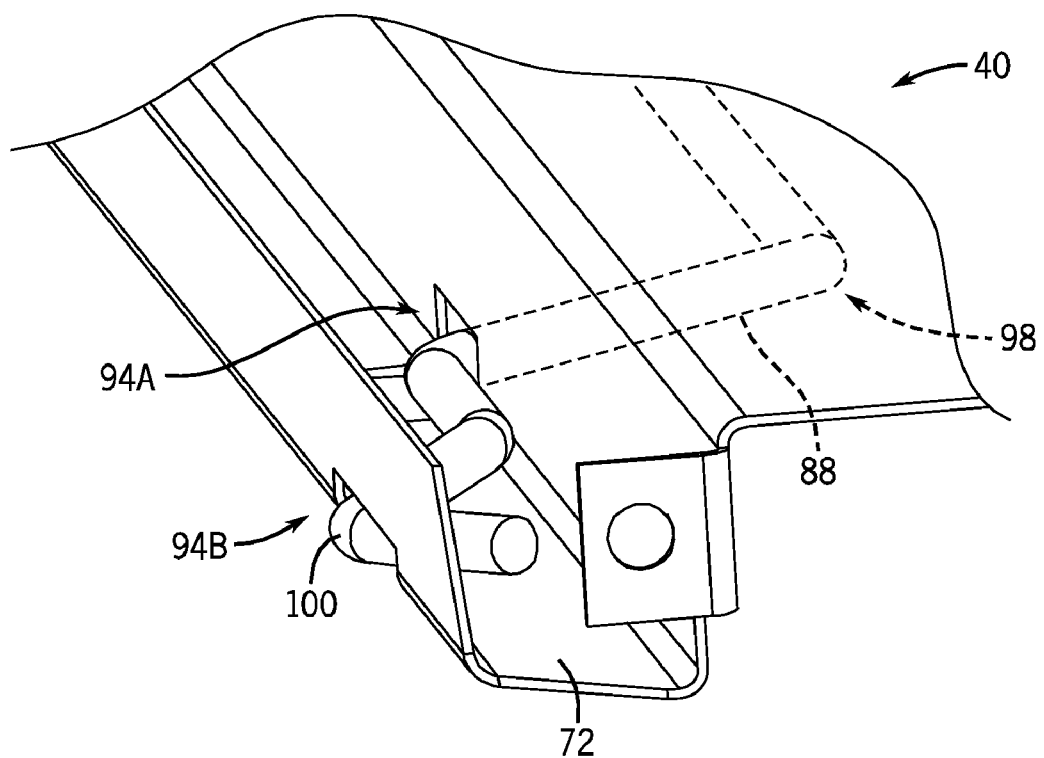
FIG. 15 is a detail view of an embodiment of the rotatable guide in the horizontal position.

FIGS. 14 and 15 depict a detailed view of openings 94A and 94B, which may secure guide 88 in vertical position 96 and horizontal position 98. Ends 90 of guide 88 may be inserted through openings 94A and may rotate within openings 94A to move guide 88 between vertical position 96 and horizontal position 98. Although only one of the ends of guide 88 is shown in FIGS. 14 and 15, each end 90 may be inserted through openings 94A as shown in FIGS. 14 and 15. One or both ends 90 of guide 88 may include a bent portion 100. As shown in FIG. 14, when guide 88 is in vertical position 96, bent portion 100 may rest within rail 72 and guide 88 may hang freely from rail 72 to support a wide filter 38 (FIG. 3). The sides of rail 72 may restrict rotation of guide 88 within opening 94A to provide support for wide filter 38.

To support a narrow filter 76 (FIG. 13), guide 88 may be rotated to horizontal position 98 as shown in FIG. 15. Bent portion 100 may extend through opening 94B and may rest against the outer side of rail 72 to secure guide 88 in horizontal position 98. In certain embodiments, bent portion 100 may be constructed of a flexible material to facilitate insertion through opening 94B. As may be appreciated, openings 94A and 94B and bent portion 100 are provided by way of example only, and are not intended to be limiting. In other embodiments, the relative positions of the openings, the number of openings, and the geometry of ends 90 of guide 88 may vary.

Figure 16:
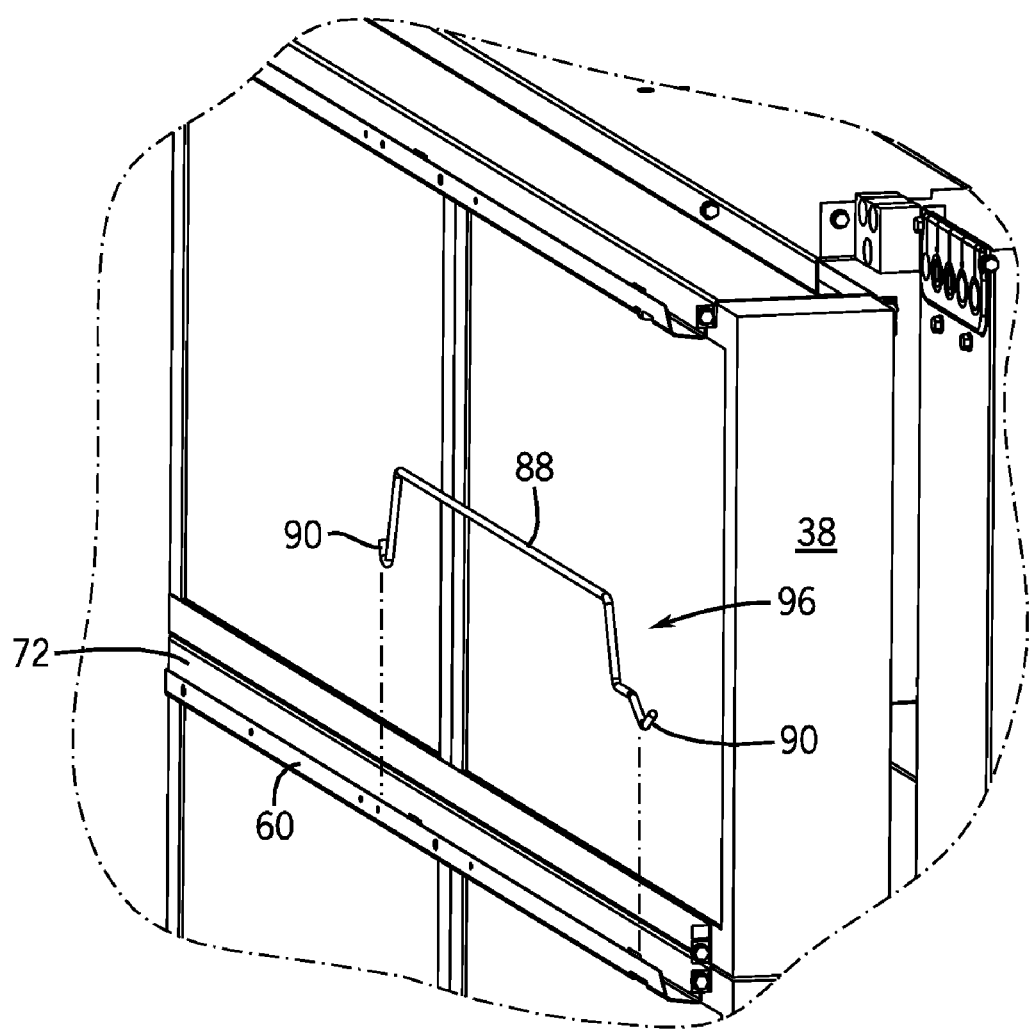
FIG. 16 is a perspective view of another embodiment of a rotatable guide.

As shown in FIGS. 11-15, guide 88 is inserted on the upper rail 72 of filter rack 40. However, in other embodiments, guide 88 may be inserted on the lower rail 72 as shown in FIG. 16. In vertical position 96, guide 88 may extend upward from rail 72 to accommodate wider filter 38. To support a narrow filter 76, guide 88 may be rotated to horizontal position 98, as generally shown in FIG. 11. Although not shown, in this embodiment, openings may be included on the inner sidewall of rail 72 to facilitate rotation of guide 88 between vertical position 96 and horizontal position 98. The vertical position of guide 88 allows the entire width of base 60 to be used to receive the filter.

The filter racks described herein may find application in a wide variety of HVAC units employing filters. For example, the filter racks may be used in air conditioning units, heat pump units, air handlers, or fan coil units. The filter racks are particularly well-suited to single package rooftop units but may be used in any type of air handling device. The adjustable filter racks are intended to provide flexibility by allowing adjustments to accommodate filters of various thicknesses.

Further, any combination of the filter racks described herein may be employed. For example, in certain embodiments, inserts 62 with tabs 66 as shown in FIGS. 4-7 may be employed in the lower filter racks 40 to support the lower portion of filters 38 and 76 while guides 88 as shown in FIGS. 11-15 may be employed in the upper filter racks 40 to support the upper portion of filters 38 and 40. In another example, inserts 62 with tabs 66 as shown in FIGS. 4-7 may be employed on both the upper and lower filter racks 40 to support the upper and lower portions of filters 38 and 76. In yet another example, guides 88 may be affixed to rails 72 of both the upper and lower filter racks 40 to support the upper and lower portions of filters 38 and 76. In other embodiments, any combination of guides 88, inserts 62, and/or dividers 78 may be employed to support the lower portion, the upper portion, or both the lower portion and the upper portion of the filters 38 and 76.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A filter rack system comprising:
a filter rack slideably disposable within an heating, ventilating, and/or air conditioning unit; and
a moveable guide secured within the filter rack and movable between a first position for supporting a narrow filter and a second position for supporting a wide filter, wherein the moveable guide is movable between the first and second positions while secured within the filter rack, wherein the moveable guide comprises a rotatable rod rotatable between the first and second positions.

2. The filter rack system of claim 1, comprising a locking system, wherein the rotatable rod interfaces with the locking system to secure the rotatable rod in the first position and in the second position.

3. The filter rack system of claim 2, wherein the rotatable rod interfaces with the locking system to secure the rotatable rod in an intermediate position between the first position and the second position.

4. The filter rack system of claim 1, wherein the rotatable rod comprises a bent portion designed to extend through an opening of the filter rack to secure the rotatable rod in the first position.

5. The filter rack system of claim 1, wherein the narrow filter has a width of approximately two inches and wherein the wide filter has a width of approximately four inches.

6. A filter rack system comprising:
a filter rack mountable within a heating, ventilating, and/or air conditioning unit and including a U-shaped channel defined by a base and a pair of rails for receiving a filter;
an upper moveable guide secured within the filter rack and movable between a first position for supporting an upper portion of a narrow filter and a second position for supporting an upper portion of a wide filter, wherein the upper moveable guide is movable between the first and second positions while secured within the filter rack; and
a lower moveable guide secured within the filter rack and moveable between a third position for supporting a lower portion of the narrow filter and a fourth position for supporting a lower portion of the wide filter, wherein the lower moveable guide is moveable between the third and fourth positions while secured within the filter rack;

wherein the upper moveable guide comprises a rotatable rod rotatable between the first and second positions or a perforated tab bendable between the first and second positions; and wherein the lower moveable guide comprises a rotatable rod rotatable between the third and fourth positions or a perforated tab bendable between the third and fourth positions.

7. The filter rack system of claim 6, wherein the upper moveable guide comprises the rotatable rod rotatable between the first and second positions and wherein the lower moveable guide comprises the perforated tab bendable between the third and fourth positions.

8. The filter rack system of claim 6, wherein the upper moveable guide comprises the perforated tab bendable between the first and second positions and wherein the lower moveable guide comprises the rotatable rod rotatable between the third and fourth positions.

9. The filter rack system of claim 6, wherein the upper moveable guide comprises the perforated tab bendable between the first and second positions and wherein the lower moveable guide comprises the perforated tab bendable between the third and fourth positions.

10. The filter rack system of claim 6, wherein the upper moveable guide comprises the rotatable rod rotatable between the first and second positions and wherein the lower moveable guide comprises the rotatable rod rotatable between the third and fourth positions.

11. The filter rack system of claim 6, wherein the upper moveable guide comprises the rotatable rod and comprising a locking system that interfaces with the rotatable rod to secure the guide in the first position.

12. The filter rack system of claim 6, wherein the upper moveable guide comprises the rotatable rod, wherein the rotatable rod extends generally parallel to the filter rack in the first position and wherein the rotatable rod extends generally perpendicular to the filter rack in the second position.

13. A filter rack system comprising:
a filter rack mountable within a heating, ventilating, and/or air conditioning unit and including a U-shaped channel defined by a base and a pair of rails for receiving a filter; and
a tab bendable between a first position to partition a width of the U-shaped channel to accommodate a narrow filter and a second position to accommodate a wide filter.

14. The filter rack system of claim 13, comprising an insert designed to move along the base between the rails, wherein the tab is connected to the insert and spaces the insert from one of the rails in the first position and disposes the insert against one of the rails in the second position.

15. The filter rack system of claim 13, wherein in the first position the tab lies in a generally flat manner on the base and wherein in the second position the tab extends generally orthogonal to the base.

16. The filter rack system of claim 13, wherein the tab is removable from the U-shaped channel.

17. The filter rack system of claim 13, wherein the tab is disposed on an insert comprising a bottom that lies generally flat on the base and comprising an insert rail that partitions the width of the U-shaped channel to accommodate the narrow filter and rests against one of the rails to accommodate the wide filter.

18. A filter rack system comprising:
a filter rack slideably disposable within an heating, ventilating, and/or air conditioning unit; and
a moveable guide secured within the filter rack and movable between a first position for supporting a narrow filter and a second position for supporting a wide filter, wherein the moveable guide is movable between the first and second positions while secured within the filter rack, wherein the moveable guide comprises a perforated tab bendable between the first and second positions.

19. The filter rack system of claim 18, wherein the filter rack comprises a base and wherein the moveable guide comprises an insert designed to move along the base between the first and second positions.

\* \* \* \* \*